United States Patent
Zhao et al.

(10) Patent No.: US 8,965,213 B2
(45) Date of Patent: *Feb. 24, 2015

(54) ANTENNA DEVICE

(71) Applicant: Huawei Technologies Co., Ltd., Shenzhen (CN)

(72) Inventors: Ming Zhao, Milan (IT); Jianjun Chen, Shenzhen (CN); Xueru Liu, Shenzhen (CN); Pinghua He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

This patent is subject to a terminal disclaimer.

(21) Appl. No.: 13/669,014

(22) Filed: Nov. 5, 2012

(65) Prior Publication Data

US 2013/0070819 A1   Mar. 21, 2013

Related U.S. Application Data

(63) Continuation of application No. 13/240,910, filed on Sep. 22, 2011, now Pat. No. 8,346,092, which is a continuation of application No. PCT/CN2009/071973, filed on May 26, 2009.

(51) Int. Cl.
*H04B 10/00* (2013.01)
*H04B 1/38* (2006.01)
(Continued)

(52) U.S. Cl.
CPC .............. *H04B 1/38* (2013.01); *H01Q 1/246* (2013.01); *H01Q 21/062* (2013.01); *H01Q 21/28* (2013.01)
USPC ........... 398/115; 398/116; 398/118; 398/128; 398/130

(58) Field of Classification Search
USPC ......... 398/115, 116, 117, 118, 138, 139, 128, 398/130, 135; 375/219
See application file for complete search history.

(56) References Cited

U.S. PATENT DOCUMENTS 6,333,720 B1   12/2001   Goettl et al.
6,480,155 B1   11/2002   Eggleston
(Continued)

FOREIGN PATENT DOCUMENTS

CN   1303528 A   7/2001
CN   1434990 A   8/2003
(Continued)

OTHER PUBLICATIONS

Office Action issued in corresponding Chinese Patent Application No. 200980155904.9, mailed Jan. 31, 2013.
(Continued)

*Primary Examiner* — M. R. Sedighian
(74) *Attorney, Agent, or Firm* — Brinks Gilson & Lione

(57) ABSTRACT

An antenna device is provided, which includes a first antenna unit and a second antenna unit. The first antenna unit includes a first radiation module, a power divider/combiner network connected to the first radiation module, and a feeder interface connected to the power divider/combiner network. The feeder interface is configured to connect to a radio remote unit (RRU) or a base station. The second antenna unit includes a second radiation module, a transceiver array connected to the second radiation module, a baseband processing unit (BPU) connected to the transceiver array, and an interface connected to the BPU. The interface of the second antenna unit is configured to connect to a baseband unit (BBU). Therefore, after the existing passive antenna is replaced by the provided antenna device, the RRU or base station in the original network can still be used, which reduces waste of resources.

20 Claims, 5 Drawing Sheets

(51) Int. Cl.
*H01Q 1/24* (2006.01)
*H01Q 21/06* (2006.01)
*H01Q 21/28* (2006.01)

(56) References Cited

U.S. PATENT DOCUMENTS

| | | | |
|---|---|---|---|
| 7,450,853 B2 * | 11/2008 | Kim et al. | 398/115 |
| 7,627,250 B2 | 12/2009 | George et al. | |
| 7,812,775 B2 | 10/2010 | Babakhani et al. | |
| 8,032,030 B2 | 10/2011 | Pessoa et al. | |
| 8,064,533 B2 | 11/2011 | Rofoguaran | |
| 8,116,239 B2 * | 2/2012 | Proctor et al. | 370/279 |
| 8,175,459 B2 | 5/2012 | Thelen et al. | |
| 8,346,091 B2 * | 1/2013 | Kummetz et al. | 398/115 |
| 2003/0092403 A1 | 5/2003 | Shapira et al. | |
| 2003/0092493 A1 | 5/2003 | Shimizu et al. | |
| 2004/0204109 A1 | 10/2004 | Hoppenstein | |
| 2006/0025812 A1 | 2/2006 | Shelton | |
| 2006/0244675 A1 | 11/2006 | Elliot et al. | |
| 2008/0317464 A1 | 12/2008 | Li et al. | |

FOREIGN PATENT DOCUMENTS

| | | | |
|---|---|---|---|
| CN | 1503587 | A | 6/2004 |
| CN | 1663075 | A | 8/2005 |
| CN | 1679649 | A | 10/2005 |
| CN | 2744003 | Y | 11/2005 |
| CN | 1434990 | A | 8/2006 |
| CN | 101026267 | A | 8/2007 |
| CN | 10143238 | A | 9/2007 |
| CN | 101043238 | A | 9/2007 |
| EP | 1227545 | A1 | 7/2002 |
| GB | 2393580 | A | 3/2004 |
| GB | 2440192 | A | 1/2008 |
| WO | WO 01/76012 | A1 | 10/2001 |
| WO | 03/041224 | A1 | 5/2003 |
| WO | WO 03041224 | A1 | 5/2003 |
| WO | WO 2004001902 | A1 | 12/2003 |
| WO | 2006/094441 | A1 | 9/2006 |
| WO | WO 2006094441 | A1 | 9/2006 |
| WO | 2007/040048 | A1 | 1/2007 |
| WO | WO 2007004048 | A1 | 1/2007 |
| WO | WO 2010135862 | A1 | 12/2010 |

OTHER PUBLICATIONS

Search Report issued in corresponding Chinese Patent Application No. 200980155904.9, mailed Jan. 24, 2013.
Notice of Allowance issued in commonly owned U.S. Appl. No. 13/240,910, mailed Aug. 30, 2012.
Written Opinion of the International Searching Authority issued in corresponding PCT Patent Application No. PCT/CN2009/071973, mailed Feb. 25, 2010.
International Search Report issued in corresponding PCT Patent Application No. PCT/CN2009/071973, mailed Feb. 25, 2010.
International Search Report from the Chinese Office in the International Application No. PCT/CN2009/071973 mailed Feb. 25, 2010.

* cited by examiner

ANTENNA DEVICE

CROSS-REFERENCE TO RELATED APPLICATIONS

This application is a continuation of U.S. patent application Ser. No. 13/240,910, filed on Sep. 22, 2011, which is a continuation of International Application No. PCT/CN2009/071973, filed on May 26, 2009, both of which are hereby incorporated by reference in their entireties.

FIELD OF THE TECHNOLOGY

The present invention relates to the field of communications technology, and more particularly to an antenna device.

BACKGROUND OF THE INVENTION

In a mobile communication system, a macro base station is usually installed in an equipment room under a tower, or outdoors under a tower (with no equipment room). In this case, the macro base station under the tower and an antenna on the tower need to be connected through a long high-power radio-frequency (RF) cable (feeder). However, the loss rises with the increase of the length of a feeder, and is generally around 3 dB.

In order to reduce the feeder loss to the minimum, the base station tends to be moved onto the tower. An existing radio remote unit (RRU) and an integrated antenna (RRU+Antenna) to be proposed are such products. More advanced products include an active antenna and an intelligent antenna.

As shown in FIG. 1, the RRU is located at a link between a passive antenna and an indoor baseband unit (BBU). Interface signals between the RRU and the passive antenna are RF signals, and the RRU is connected to the passive antenna through a feeder. Interface signals between the RRU and the BBU are common public radio interfaces (CPRIs) or other digital signals, and the RRU is connected to the BBU through an optical fiber (definitely, the RRU and the BBU may also communicate through an electrical interface or other digital signals). As shown in FIG. 2, external interfaces of the integrated antenna, the active antenna, or the intelligent antenna are CPRIs or other digital signals, and can be connected to the BBU through optical fibers.

Macro base stations invested and constructed by operators in the early stage and the currently popular RRU products may not be abandoned due to the emergence of the integrated antenna (or the active antenna), as the early investment of the operators is huge, and the maximization of investment returns has to be considered. Because the macro base stations and RRU products are still used in the network, the commercialization of the integrated antenna, or the active antenna and intelligent antenna having more powerful functions is affected.

The functions of the macro base station and RRU are integrated in the integrated antenna, active antenna, or intelligent antenna, so that the functions of these antennas are more powerful. In the process of newly establishing a communication network, if the integrated antenna, active antenna, or intelligent antenna is configured to replace the passive antenna connected to the macro base station or RRU in the existing network, because the interface signals of the communication between the macro base station or RRU and the passive antenna are RF signals, after the replacement, the integrated antenna, active antenna, or intelligent antenna is not compatible with the existing macro base station or RRU. As a result, the macro base station or RRU becomes unnecessary, which causes waste of resources.

SUMMARY OF THE INVENTION

The present disclosure is directed to an antenna device. According to some embodiments of the present disclosure, the RRU or macro base station in the existing network can still be used after an existing passive antenna is replaced by an antenna device, which reduces waste of resources.

In an embodiment, the present invention provides an antenna device, which includes a first antenna unit and a second antenna unit. The first antenna unit comprises a first radiation module, a power divider/combiner network connected to the first radiation module, and a feeder interface connected to the power divider/combiner network, wherein the feeder interface is configured to connect to a radio remote unit (RRU) or a base station; the second antenna unit comprises a second radiation module, a transceiver array connected to the second radiation module, a baseband processing unit (BPU) connected to the transceiver array, and an interface connected to the BPU, wherein the interface is configured to connect to a baseband unit (BBU).

In an embodiment, the present invention provides another antenna device, which includes a first antenna unit and a second antenna unit. The first antenna unit comprises a first radiation module, a first power divider/combiner network connected to the first radiation module, and a feeder interface connected to the first power divider/combiner network, wherein the feeder interface is configured to connect to a radio remote unit, RRU, or a base station; the second antenna unit comprises a second radiation module, a second power divider/combiner network connected to the second radiation module, a transceiver unit connected to the second power divider/combiner network, a baseband processing unit (BPU) connected to the transceiver unit, and an interface connected to the BPU, wherein the interface is configured to connect to a baseband unit (BBU).

As described above, in the antenna device of the present invention, the first antenna unit is connected to the RRU or base station and the second antenna unit is connected to the BBU, so that the two antenna units are integrated in one device. When the antenna device according to the embodiment of the present invention is configured to replace the passive antenna in the prior art, the RRU or base station in the existing network is connected to the first antenna unit, and thus the first antenna unit may use existing frequency bands to work. Besides, the second antenna unit is connected to the BBU. Therefore, after the original passive antenna is replaced by the antenna device of the present invention, the RRU or base station in the original network can still be used, which reduces waste of resources.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those skilled in the art can derive other drawings from such accompanying drawings without any creative effort.

DETAILED DESCRIPTION OF THE EMBODIMENTS

For better understanding of the objective, technical solution and merits of the present invention, the following describes the present invention in detail with reference to the accompanying drawings. It is understandable that the embodiments herein are for the exemplary purpose only, and are not intended to limit the present invention.

Figure 1:
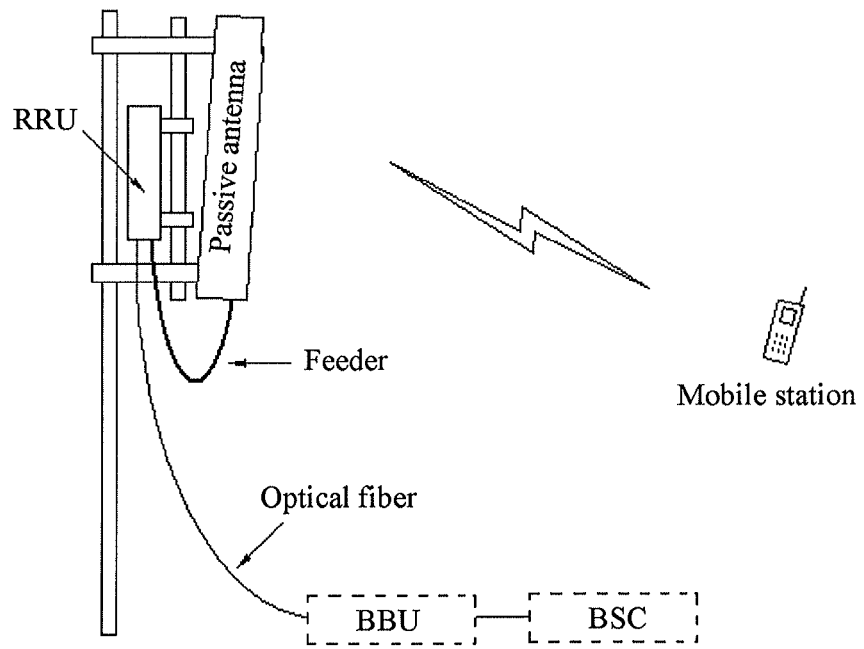
FIG. 1 is a schematic view of installation of an RRU and a BBU of a passive antenna in the prior art.
Figure 2:
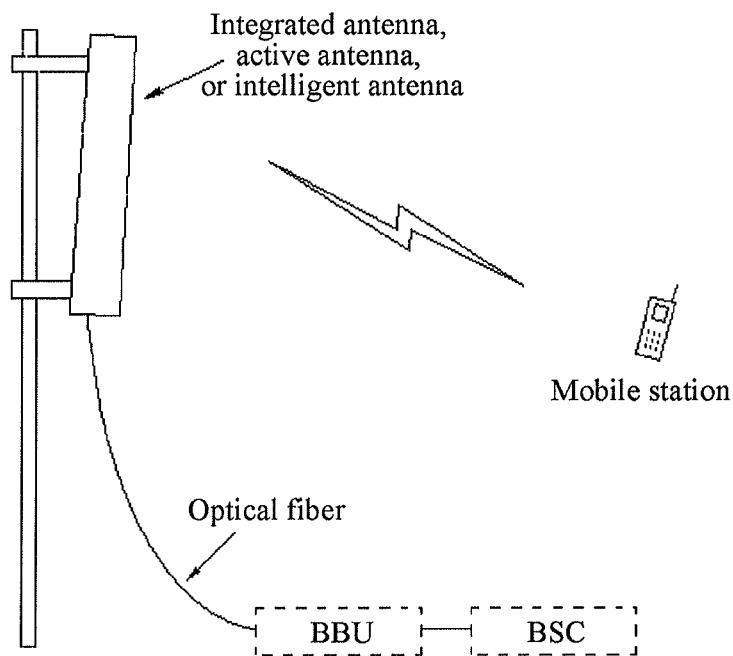
FIG. 2 is a schematic view of installation of an integrated antenna, an active antenna, an intelligent antenna, and a BBU in the prior art.
Figure 3:
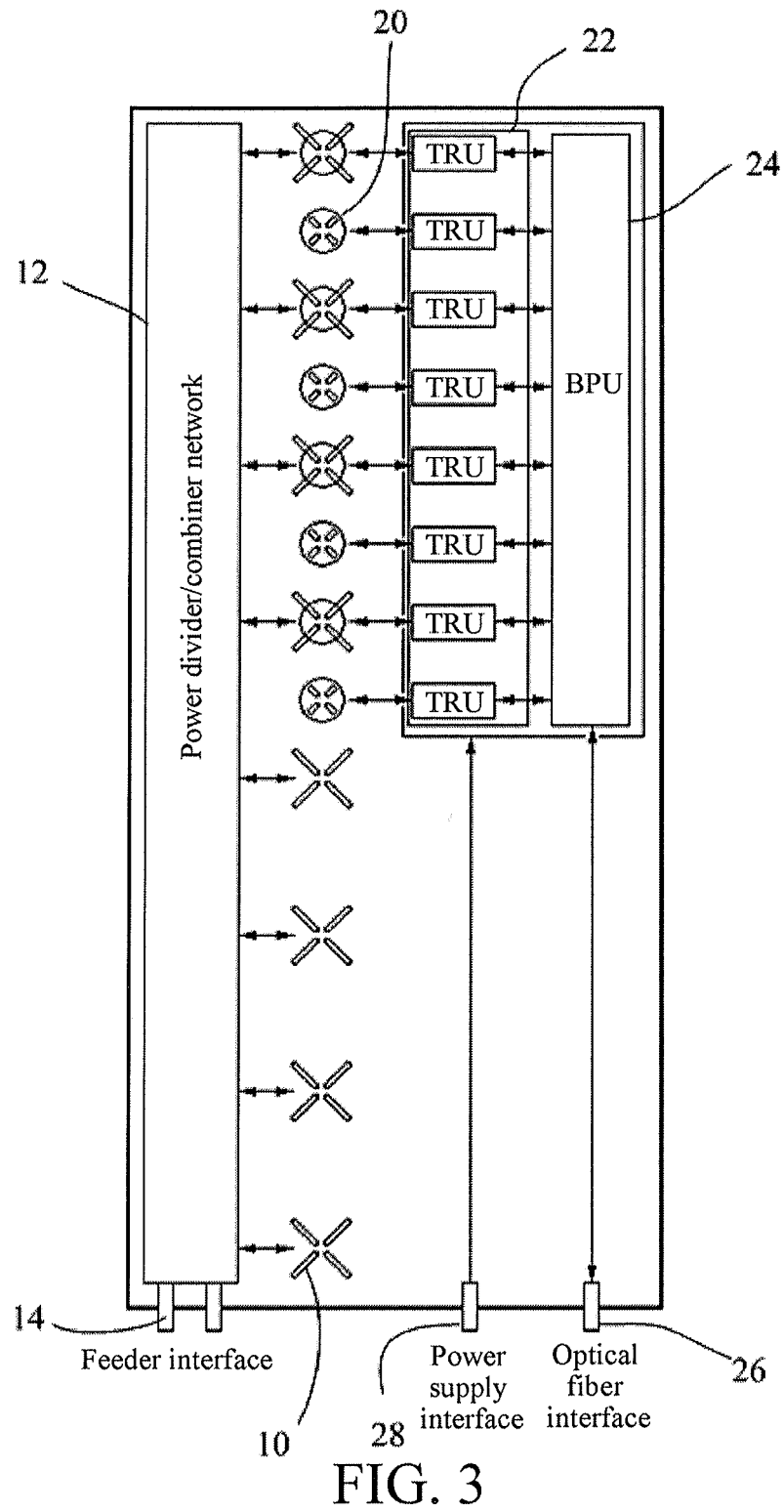
FIG. 3 is a schematic structural view of an antenna device according to a first embodiment of the present invention.

FIG. 3 is a schematic structural view of an antenna device according to a first embodiment of the present invention. The antenna device includes a first antenna unit and a second antenna unit.

The first antenna unit includes a first radiation module 10, a power divider/combiner network 12 connected to the first radiation module 10, and a feeder interface 14 connected to the power divider/combiner network 12. The first radiation module 10 may be an antenna dipole array formed of a plurality of antenna dipoles.

The feeder interface 14 is connected to an RRU or a macro base station through a feeder, and is configured to receive an RF signal transferred by the RRU or macro base station through the feeder. The power divider/combiner network 12 is configured to divide the RF signal into multiple RF signals and send the multiple RF signals to the plurality of antenna dipoles of the first radiation module 10. The first radiation module 10 converts the RF signals sent by the power divider/combiner network 12 into electromagnetic wave signals, and sends the electromagnetic wave signals.

After receiving the electromagnetic wave signals, the antenna dipoles of the first radiation module 10 convert the received electromagnetic wave signals into multiple RF signals, and send the multiple RF signals to the power divider/combiner network 12. The power divider/combiner network 12 combines the multiple RF signals into one RF signal, and sends the combined RF signal to the feeder through the feeder interface 14.

The first antenna unit may be a passive antenna, which may be connected to a feeder through the feeder interface 14. The feeder is connected to the RRU or the macro base station. The RRU or the macro base station is connected to a BBU through an optical fiber.

The second antenna unit includes a second radiation module 20, a transceiver array 22 connected to the second radiation module 20, a BPU 24 connected to the transceiver array 22, and an optical fiber interface 26 connected to the BPU 24. The second radiation modules 20 may be an antenna dipole array formed of a plurality of antenna dipoles. The transceiver array 22 includes a plurality of transceiver units. The antenna dipoles of the second radiation module 20 are connected to the corresponding transceiver units of the transceiver array 22, separately. That is, each antenna dipole of the second radiation module 20 is connected to a corresponding transceiver unit of the transceiver array 22.

The optical fiber interface 26 is connected to the BBU through an optical fiber, and is configured to receive a digital signal transferred by the BBU through the optical fiber. The BPU 24 is configured to process the received digital signal into an analog signal for transmission, and send the analog signal for transmission to the transceiver array 22. Each The transceiver unit of the transceiver array 22 modulates and up-converts the processed analog signal for transmission into an RF signal for transmission, and sends the RF signal for transmission to the corresponding antenna dipole of the second radiation module 20. The antenna dipole converts the RF signal for transmission into an electromagnetic wave signal and sends the electromagnetic wave signal.

The process for the BPU 24 to convert the received digital signal into the analog signal for transmission includes the following steps: A crest factor reduction (CFR) clipping process is performed on the digital signal output from the BBU to the optical fiber interface 26 (for example, a CPRI). Multiple IQ signals are output to a digital beam forming (DBF) module through a bus driver to realize DBF. Digital pre-distortion (DPD) is then performed on the IQ signals. The IQ signals are finally converted into analog signals for transmission with a D/A converter. The analog signals are sent to the transceiver array 22.

After receiving the electromagnetic wave signals, the antenna dipoles of the second radiation module 20 convert the received electromagnetic wave signals into RF signals for reception, and send the RF signals for reception to the transceiver units of the transceiver array 22. The transceiver unit down-converts and demodulates the RF signals for reception into analog signals for reception, and sends the analog signals for reception to the BPU 24. The BPU 24 processes the analog signals for reception into digital signals for reception, and sends the processed digital signals for reception to the BBU through the optical fiber interface 26.

The process for the BPU 24 to convert the analog signals for reception into the digital signals for reception includes the following steps: the analog signals for reception output by the transceiver array 22 are converted into digital signals for reception with an A/D converter. Digital filtering (by using a finite impulse response (FIR) filter, a cascade integrator comb (CIC) filter, and a half-band filter (HBF)) and DBF are then performed on the digital signals for reception. After correlative accumulation of each digital signal for reception in a correlative accumulator, the digital signals after correlative accumulation are transferred to the BBU through the optical fiber interface 26 (for example, the CPRI).

It is understandable that, the second antenna unit may further include a power supply interface 28, connected to the transceiver array 22 and the BPU 24, and configured to supply power to the transceiver array 22 and the BPU 24.

It is understandable that, in the embodiment of the present invention, the first antenna unit may further include a phase shift network which is configured to realize analog beam forming (ABF). The phase shift network may be integrated with the power divider/combiner network 12.

According to the embodiment of the present invention, the antenna dipoles of the first radiation module 10 and the second radiation module 20 are coaxially disposed (a working frequency band of the second antenna unit (a typical value is between 1710 MHz and 2170 MHz) is about twice as much as a working frequency band of the first antenna unit (a typical value is between 824 MHz and 960 MHz)). In another embodiment, the antenna dipoles of the first radiation module 10 and the second radiation module 20 may also be non-coaxial.

The transceiver array 22 and the BPU 24 in the second antenna unit form an RRU. The second antenna unit may be made into an integrated antenna, an active antenna, or an intelligent antenna. The active antenna is used as an example in the embodiment of the present invention. The second antenna unit is connected to an optical fiber through the optical fiber interface 26, and the optical fiber is connected to the BBU.

In the embodiment of the present invention, the first antenna unit of the antenna device is connected to the RRU or macro base station through the feeder interface and the second antenna unit is connected to the BBU through the optical fiber interface, so that the two antenna units are integrated in one device. When the antenna device according to the embodiment of the present invention is configured to replace the passive antenna in the prior art, the RRU or macro base station in the existing network is connected to the first antenna unit, and thus the first antenna unit may use existing frequency bands to work. During the establishment of a new network, the second antenna unit is connected to a BBU in another frequency band through the optical fiber interface, so that the two networks may share one antenna unit. After the same network and/or the same frequency band are expanded, the second antenna unit is connected to the BBU in the original network through the optical fiber interface. That is, the RRU in the existing network and the antenna device in the embodiment of the present invention share one BBU. Therefore, after the existing passive antenna is replaced by the antenna device in the embodiment of the present invention, the RRU or macro base station in the existing network can still be used, which reduces waste of resources.

Additionally, as the same antenna device is shared, the existing tower and station may also be used, and the operator does not need to establish a new tower or station, nor pay extra rent, thereby effectively reducing the costs of establishing a new network.

Figure 4:
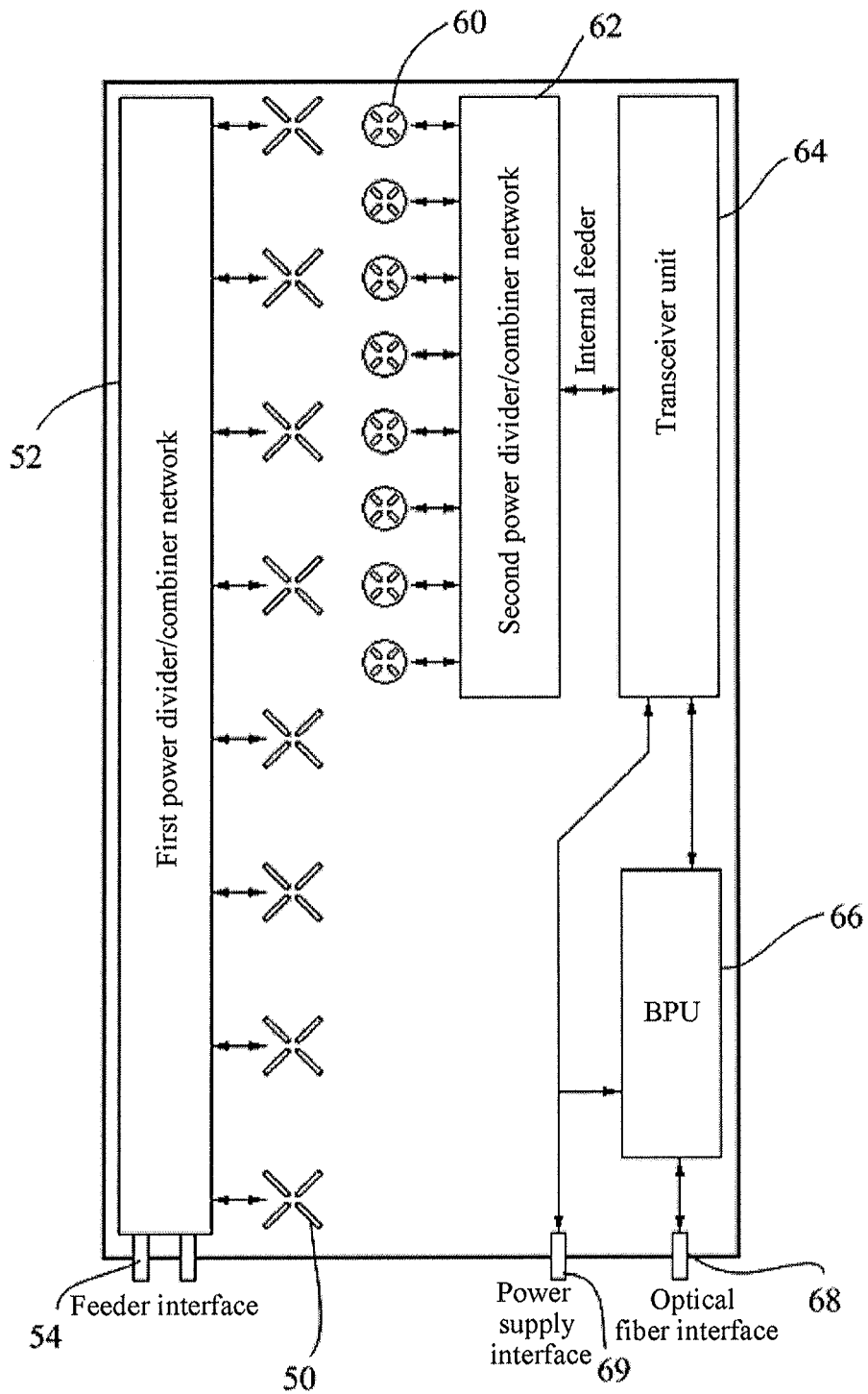
FIG. 4 is a schematic structural view of an antenna device according to a second embodiment of the present invention.

FIG. 4 is a schematic structural view of an antenna device according to a second embodiment of the present invention. The antenna device includes a first antenna unit and a second antenna unit.

The first antenna unit is the same as the first antenna unit in the antenna device according to the first embodiment of the present invention, which includes a first radiation module 50, a first power divider/combiner network 52 connected to the first radiation module 50, and a feeder interface 54 connected to the first power divider/combiner network 52. The first radiation module 50 may be an antenna dipole array formed of a plurality of antenna dipoles. A working mode of the first antenna unit is also the same as the first antenna unit in the antenna device according to the first embodiment of the present invention, and the details will not be described herein again.

The second antenna unit includes a second radiation module 60, a second power divider/combiner network 62 connected to the second radiation module 60, a transceiver unit 64 connected to the second power divider/combiner network 62, a BPU 66 connected to the transceiver unit 64, and an optical fiber interface 68. The second radiation module 60 may be an antenna dipole array formed of a plurality of antenna dipoles.

The optical fiber interface 68 is connected to a BBU through an optical fiber, and is configured to receive a digital signal transferred by the BBU through the optical fiber. The BPU 66 is configured to process the digital signal into an analog signal for transmission, and send the analog signal for transmission to the transceiver unit 64. The transceiver unit 64 modulates and up-converts the processed analog signal for transmission into an RF signal for transmission, and sends the RF signal for transmission to the second power divider/combiner network 62 through an internal feeder of the second antenna unit. The second power divider/combiner network 62 divides the RF signal for transmission into multiple signals and sends the multiple signals to the antenna dipoles of the second radiation module 60. The antenna dipoles convert the divided RF signals into electromagnetic wave signals and send the electromagnetic wave signals.

The process for the BPU 66 to convert the digital signal into the analog signal for transmission includes the following steps: A CFR clipping process is performed on the digital signal output from the BBU to the optical fiber interface 68 (for example, a CPRI). DPD is then performed on the processed signal. The signal is finally converted into an analog signal for transmission in a D/A converter and sent to the transceiver unit 64.

After receiving the electromagnetic wave signals, the antenna dipoles of the second radiation module 60 convert the received electromagnetic wave signals into multiple RF signals for reception, and send the multiple RF signals to the second power divider/combiner network 62. The second power divider/combiner network 62 combines the multiple RF signals for reception into one RF signal for reception, and sends the combined RF signal to the transceiver unit 64. The transceiver unit 64 demodulates and down-converts the RF signal for reception into an analog signal for reception, and sends the analog signal for reception to the BPU 66. The BPU 66 processes the analog signal for reception into a digital signal, and sends the digital signal to the BBU through the optical fiber interface 68.

The process for the BPU 66 to convert the analog signal for reception into the digital signal includes the following steps: A/D conversion and filtering (by using an FIR filter, a CIC filter, or an HBF) are performed on the analog signal for reception output by the transceiver unit 64, and the processed signal is then transferred to the BBU through the optical fiber interface 68 (for example, a CPRI).

It is understandable that, the second antenna unit may further include a power supply interface 69, connected to the transceiver unit 64 and the BPU 66, and configured to supply power to the transceiver unit 64 and the BPU 66.

It is understandable that, in the embodiment of the present invention, the first antenna unit may further include a first phase shift network, configured to realize ABF. The first phase shift network may be integrated with the first power divider/combiner network 52.

It is understandable that, in the embodiment of the present invention, the second antenna unit may further include a second phase shift network, configured to realize ABF. The second phase shift network may be integrated with the second power divider/combiner network 62.

In the embodiment of the present invention, the antenna dipoles of the first radiation module 50 and the second radiation module 60 are non-coaxially disposed. In another embodiment, the antenna dipoles of the first radiation module 50 and the second radiation module 60 may also be coaxial.

The transceiver unit 64 and the BPU 66 in the second antenna unit form an RRU. The second antenna unit may be made into an integrated antenna, an active antenna, or an intelligent antenna. The integrated antenna is used as an example in the embodiment of the present invention. The second antenna unit is connected to an optical fiber through the optical fiber interface 68, and the optical fiber is connected to the BBU.

In the embodiment of the present invention, the first antenna unit of the antenna device is connected to the RRU or macro base station through the feeder interface and the second antenna unit is connected to the BBU through the optical fiber interface, so that the two antenna units are integrated in one device. When the antenna device according to the embodiment of the present invention is configured to replace the passive antenna in the prior art, the RRU or macro base station in the existing network is connected to the first antenna unit, and thus the first antenna unit may use existing frequency bands to work. During the establishment of a new network, the second antenna unit is connected to a BBU in another frequency band through the optical fiber interface, so that the two networks may share one antenna unit. After the same network and/or the same frequency band are expanded, the second antenna unit is connected to the BBU in the existing network through the optical fiber interface. That is, the RRU in the existing network and the antenna device in the embodiment of the present invention share one BBU. Therefore, after the existing passive antenna is replaced by the antenna device in the embodiment of the present invention, the RRU or macro base station in the existing network can still be used, which reduces waste of resources.

Additionally, as the same antenna device is shared, the existing tower and station may also be used, and the operator does not need to establish a new tower or station, nor pay extra rent, thereby effectively reducing the costs of establishing a new network.

Figure 5:
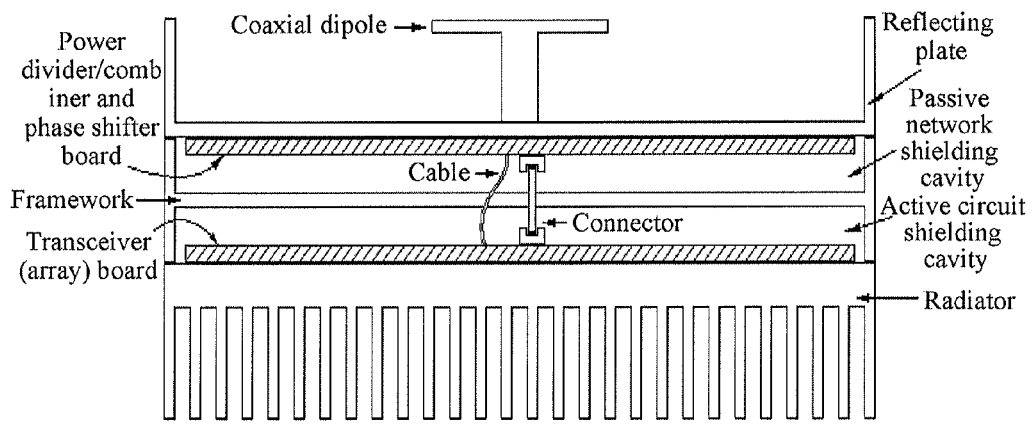
FIG. 5 is a side view of a coaxial antenna device according to an embodiment of the present invention.

FIG. 5 is a side view of a coaxial antenna device according to an embodiment of the present invention. The radiation modules of the first antenna unit and the second antenna unit are antenna dipole arrays, and the antenna dipoles are coaxially disposed.

As shown in FIG. 5, the coaxial dipoles are installed on a reflecting plate and located in a space formed by an antenna cover (not shown in the figure) and the reflecting plate.

An I-shaped framework and the reflecting plate form a first antenna unit (passive antenna) shielding cavity. The power divider/combiner network and the phase shifter are located in the shielding cavity. A power divider/combiner and phase shifter board clings to a backside of the reflecting plate.

The I-shaped framework and a radiator form a second antenna unit (active circuit) shielding cavity. A transceiver (array) board is located inside the shielding cavity. In the case of an integrated antenna, only the transceiver unit and the BPU exist. In the case of an active antenna, a transceiver array formed of N transceiver units and the BPU exist, and a transceiver unit (or transceiver array) board clings to the radiator.

Pins of the coaxial dipoles are welded on the power divider/combiner and phase shifter board. The transceiver (array) board is connected to the power divider/combiner and phase shifter board through cables or connectors. Thereby, the transceiver (array) board and the coaxial dipoles are connected through the power divider/combiner and phase shifter board.

It is understandable that, cables can be directly guided from the coaxial dipoles, and connected to the transceiver (array) board and the power divider/combiner and phase shifter board.

Figure 6:
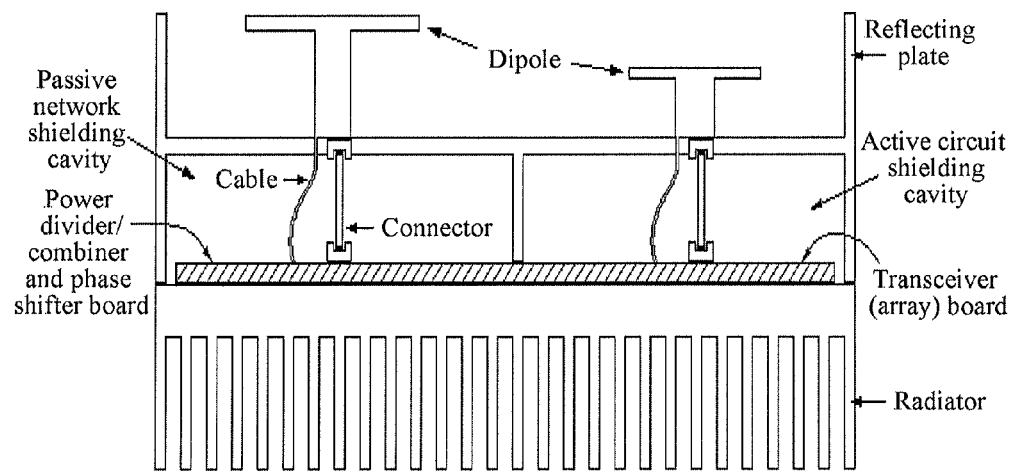
FIG. 6 is a side view of a non-coaxial antenna device according to an embodiment of the present invention.

FIG. 6 is a side view of a non-coaxial antenna device according to an embodiment of the present invention. A difference between the antenna device in FIG. 6 and the antenna device in FIG. 5 is that, the framework is omitted, and the reflecting plate and the radiator form a single-layer shielding cavity. Moreover, a separating rib is disposed at a bottom of the reflecting plate to further divide the single-layer shielding cavity into two large shielding cavities. One is the first antenna unit (passive antenna) shielding cavity, and the other one is the second antenna unit (active circuit) shielding cavity. Certainly, as long as more separating ribs are disposed at the bottom of the reflecting plate, the shielding cavity can be further divided.

The power divider/combiner and phase shifter board and the transceiver (array) board are all installed on the radiator. If the boards are coplanar, the boards may be integrated into one board, as shown in FIG. 6; if the boards are not coplanar, the boards are separated. The boards are connected to the antenna dipoles through cables and connectors.

Figure 7:
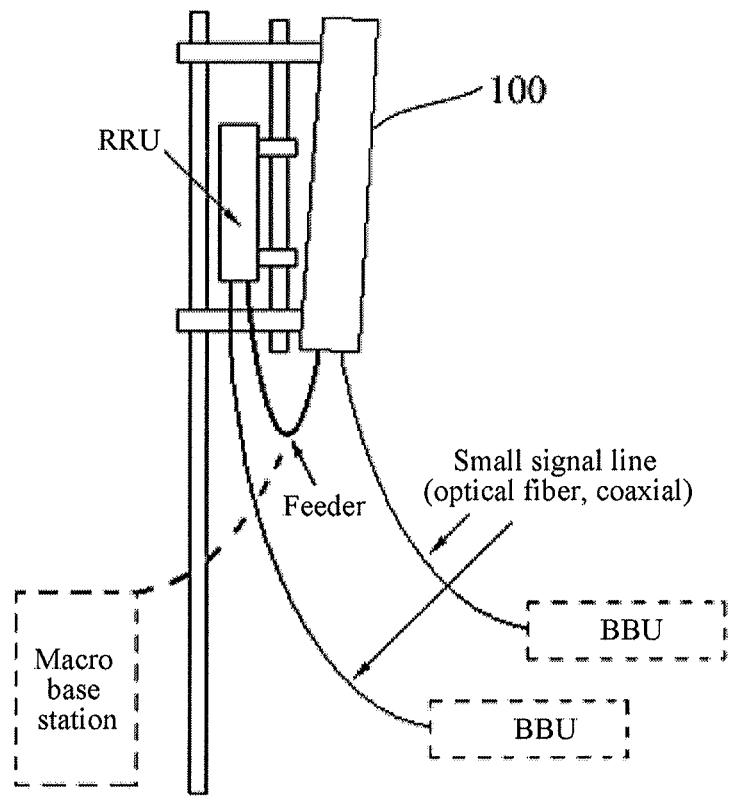
FIG. 7 is a schematic view of installation of an antenna device and a base station according to an embodiment of the present invention.

FIG. 7 is a schematic view of installation of an antenna device 100 and a base station according to an embodiment of the present invention. As the antenna device 100 according to the embodiment of the present invention includes a first antenna unit and a second antenna unit, after the passive antenna in the prior art is replaced by the antenna device 100, the first antenna is connected to a feeder through a feeder interface, and the feeder is then connected to an RRU or a macro base station in the existing network. The second antenna unit is connected to an optical fiber through an optical fiber interface. During the construction of a network with a new license, the optical fiber is connected to a BBU in another frequency band, so as to realize the construction of the desired network. In this manner, the originally established RRU or macro base station can still be used, which effectively reduces waste of resources. After the existing network is expanded, the optical fiber is connected to the BBU in the existing network, such that the RRU in the existing network and the antenna device 100 in the embodiment of the present invention share one BBU.

Although the present invention is described above with some exemplary embodiments, the scope thereof is not limited thereby. Various modifications and variations that can be easily thought of by persons skilled in the art without departing from the scope of the invention shall be considered falling within the scope of the invention. Therefore, the protection scope of the invention falls in the appended claims.

What is claimed is:

1. An antenna device, comprising a first antenna unit and a second antenna unit, wherein
   the first antenna unit comprises a first radiation module, a power divider/combiner network connected to the first radiation module, and a feeder interface connected to the power divider/combiner network, wherein the feeder interface is configured to connect to a radio remote unit (RRU) or a base station;
   the second antenna unit comprises a second radiation module, a transceiver array connected to the second radiation module, a baseband processing unit (BPU) connected to the transceiver array, and an interface connected to the BPU, wherein the interface is configured to connect to a baseband unit (BBU).

2. The antenna device according to claim 1, wherein the first radiation module comprise at least two antenna dipoles; the second radiation module comprises at least two antenna dipoles.

3. The antenna device according to claim 2, wherein the antenna dipoles of the first antenna unit and the antenna dipoles of the second antenna are coaxially disposed or non-coaxially disposed.

4. The antenna device according to claim 1, wherein the feeder interface is configured to receive a radio frequency (RF) signal transferred by the RRU or base station, the power divider/combiner network is configured to divide the RF signal into multiple RF signals and send the multiple RF signals to the first radiation module, and the first radiation module is configured to convert the RF signals sent by the power divider/combiner network into electromagnetic wave signals and send the electromagnetic wave signals.

5. The antenna device according to claim 2, wherein the interface of the second antenna unit is configured to receive a digital signal transferred by the BBU, and the BPU is configured to process the received digital signal into an analog signal and send the analog signal to the transceiver array.

6. The antenna device according to claim 5, wherein the transceiver array comprises at least two transceiver units corresponding to the at least two antenna dipoles of the second radiation module, each transceiver unit is configured to modulate and up-convert the analog signal into an RF signal and send the RF signal to the corresponding antenna dipole of the second radiation module, and the antenna dipole of the second radiation module is configured to convert the RF signal into an electromagnetic wave signal and send the electromagnetic wave signal.

7. The antenna device according to claim 2, wherein the antenna dipoles of the second radiation module are configured to receive electromagnetic wave signals, convert the received electromagnetic wave signals into RF signals and send the RF signals to the corresponding transceiver units of the transceiver array, the transceiver units are configured to down-convert and demodulate the RF signals into analog signals, and send the analog signals to the BPU, the BPU is configured to process the analog signals into an digital signal and send the processed digital signal to the BBU through the interface of the second antenna unit.

8. The antenna device according to claim 1, wherein the second antenna unit further comprises a power supply interface connected to the transceiver array and the BPU, the power supply interface is configured to supply power to the transceiver array and the BPU.

9. The antenna device according to claim 1, wherein the interface of the second antenna unit is a common public radio interface (CPRI).

10. The antenna device according to claim 9, wherein CPRI connects to the BBU through an optical fiber.

11. An antenna device, comprising a first antenna unit and a second antenna unit, wherein
the first antenna unit comprises a first radiation module, a first power divider/combiner network connected to the first radiation module, and a feeder interface connected to the first power divider/combiner network, wherein the feeder interface is configured to connect to a radio remote unit, RRU, or a base station;
the second antenna unit comprises a second radiation module, a second power divider/combiner network connected to the second radiation module, a transceiver unit connected to the second power divider/combiner network, a baseband processing unit (BPU) connected to the transceiver unit, and an interface connected to the BPU, wherein the interface is configured to connect to a baseband unit (BBU).

12. The antenna device according to claim 11, wherein the first radiation module comprise at least two antenna dipoles; the second radiation module comprises at least two antenna dipoles.

13. The antenna device according to claim 12, wherein the antenna dipoles of the first antenna unit and the antenna dipoles of the second antenna are coaxially disposed or non-coaxially disposed.

14. The antenna device according to claim 11, wherein the feeder interface is configured to receive a radio frequency (RF) signal transferred by the RRU or base station, the first power divider/combiner network is configured to divide the RF signal into multiple RF signals and send the multiple RF signals to the first radiation module, and the first radiation module is configured to convert the RF signals sent by the first power divider/combiner network into electromagnetic wave signals and send the electromagnetic wave signals.

15. The antenna device according to claim 12, wherein the interface of the second antenna unit is configured to receive a digital signal transferred by the BBU, and the BPU is configured to process the digital signal into an analog signal and send the analog signal to the transceiver unit.

16. The antenna device according to claim 15, wherein the transceiver unit is configured to modulate and up-convert the processed analog signal into a radio frequency (RF) signal and send the RF signal to the second power divider/combiner network, the second power divider/combiner network is configured to divide the RF signal into multiple signals and send the multiple signals to the antenna dipoles of the second radiation module, and the antenna dipoles are configured to convert the divided RF signals into electromagnetic wave signals and send the electromagnetic wave signals.

17. The antenna device according to claim 12, wherein the antenna dipoles of the second radiation module are configured receive electromagnetic wave signals, convert the received electromagnetic wave signals into multiple RF signals and send the multiple RF signals to the second power divider/combiner network, the second power divider/combiner network is configured to combine the multiple RF signals into one RF signal, and send the combined RF signal to the transceiver unit, the transceiver unit is configured to demodulate and down-convert the RF signal into an analog signal and send the analog signal to the BPU, the BPU is configured to process the analog signal into a digital signal and send the digital signal to the BBU.

18. The antenna device according to claim 11, wherein the second antenna unit further comprises a power supply interface, connected to the transceiver unit and the BPU, configured to supply power to the transceiver unit and the BPU.

19. The antenna device according to claim 11, wherein the interface of the second antenna unit is a common public radio interface (CPRI).

20. The antenna device according to claim 19, wherein CPRI connects to the BBU through an optical fiber.

* * * * *